United States Patent
Biskeborn et al.

(10) Patent No.: US 7,382,569 B2
(45) Date of Patent: Jun. 3, 2008

(54) PROGRESSIVE TRACK WIDTH HEAD AND METHOD

(75) Inventors: Robert Glenn Biskeborn, Hollister, CA (US); James Mitchell Karp, Tucson, AZ (US)

(73) Assignee: Intenational Business Machines Corporation, Armonk, NY (US)

( * ) Notice: Subject to any disclaimer, the term of this patent is extended or adjusted under 35 U.S.C. 154(b) by 0 days.

(21) Appl. No.: 11/548,663

(22) Filed: Oct. 11, 2006

(65) Prior Publication Data

US 2008/0088963 A1 Apr. 17, 2008

(51) Int. Cl.
G11B 5/584 (2006.01)

(52) U.S. Cl. .............. 360/77.12; 360/316; 360/121

(58) Field of Classification Search .......... 360/77.12, 360/78.02, 121, 316
See application file for complete search history.

(56) References Cited

U.S. PATENT DOCUMENTS

| | | | |
|---|---|---|---|
| 3,947,972 A * | 4/1976 | Freeman | 360/121 |
| 5,181,150 A | 1/1993 | Hayakawa et al. | |
| 5,436,780 A * | 7/1995 | Nagata et al. | 360/121 |
| 5,488,525 A * | 1/1996 | Adams et al. | 360/77.12 |
| 5,771,142 A * | 6/1998 | Maurice et al. | 360/121 |
| 5,953,184 A | 9/1999 | Barber et al. | |
| 5,959,812 A | 9/1999 | Rothermel | |
| 6,040,963 A | 3/2000 | Rothermel | |
| 6,477,003 B1 * | 11/2002 | Kalfs et al. | 360/121 |
| 7,154,691 B2 * | 12/2006 | Girvin et al. | 360/121 |
| 7,170,709 B2 * | 1/2007 | Okafuji et al. | 360/77.12 |
| 7,253,988 B2 * | 8/2007 | Okafuji et al. | 360/77.12 |
| 2007/0047142 A1 * | 3/2007 | Biskeborn | 360/129 |
| 2007/0097541 A1 * | 5/2007 | Okafuji et al. | 360/77.12 |

FOREIGN PATENT DOCUMENTS

JP   58177518 A   10/1983

* cited by examiner

*Primary Examiner*—Hoa T. Nguyen
*Assistant Examiner*—James L. Habermehl
(74) *Attorney, Agent, or Firm*—Zilka-Kotab, PC

(57) ABSTRACT

A tape head according to one embodiment includes an array of readers, each of the readers having a track width, wherein the track width of an inner reader of the array is greater than a track width of an outer reader relative thereto. A tape head according to another embodiment includes an array of readers, each of the readers having a track width, wherein the track widths of at least some of the readers progressively decrease in a direction along the array from a middle of the array towards an end of the array.

34 Claims, 8 Drawing Sheets

PROGRESSIVE TRACK WIDTH HEAD AND METHOD

FIELD OF THE INVENTION

The present invention relates to data storage systems, and more particularly, this invention relates to a head having readers of varying track width.

BACKGROUND OF THE INVENTION

Business, science and entertainment applications depend upon computing systems to process and record data. In these applications, large volumes of data are often stored or transferred to nonvolatile storage media, such as magnetic discs, magnetic tape cartridges, optical disk cartridges, floppy diskettes, or floptical diskettes. Typically, magnetic tape is the most economical, convenient, and secure means of storing or archiving data.

Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is currently measured in hundreds of gigabytes.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. Later sensors using the GMR effect were developed. AMR and GMR sensors transduce magnetic field changes to resistance changes, which are processed to provide digital signals. AMR and GMR sensors offer signal levels higher than those available from conventional inductive read heads for a given read sensor width and so enable smaller reader widths and thus more tracks per inch, and thus higher data storage density. Moreover, the sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

The quantity of data stored on a magnetic tape may be increased by increasing the number of data tracks across the tape. More tracks are made possible by reducing feature sizes of the readers and writers, such as by using thin-film fabrication techniques and MR sensors. However, the feature sizes of readers and writers cannot be arbitrarily reduced. Factors such as lateral tape motion transients and tape lateral expansion and contraction must be balanced with reader/writer sizes that provide acceptable written tracks and readback signals. One particular problem limiting areal density is misregistration caused by tape lateral expansion and contraction. Tape width can vary by up to about 0.1% due to expansion and contraction caused by changes in humidity, tape tension, temperature, etc.

Thus, while the reader/writer array width does not change, the spacing of the data tracks on the tape will vary as the tape expands and contracts. Ideally, the reader track width would be as wide as the data track being read, this would provide the best signal. However, sensor track widths cannot be made as wide as the data tracks, because the sensors would read adjacent tracks upon expansion or contraction of the tape and/or due to lateral misregistration between tape and head. Accordingly, reader widths are currently designed to be substantially smaller than the data track width, and all readers in a given head having the same track width. The reader track width is selected to accommodate the worst case scenarios, i.e., the designer takes into account maximum expansion/contraction and lateral misregistration when determining reader track width so that each sensor is over a given track at any time. FIGS. 1A-1C represent the effect of tape lateral expansion and contraction on reader position relative thereto. FIG. 1A shows the head 100 relative to the tape 102, where the tape has a nominal width. As shown, the readers 104 are aligned with the data tracks 106 on the tape 102. FIG. 1B shows the effect of tape lateral contraction. As shown, the outermost readers 108 are positioned along the outer edges of the outer data tracks. FIG. 1C shows the effect of tape lateral expansion. As shown, the outermost readers 108 are positioned along the inner edges of the outer data tracks. Because all of the readers 104 have the same width, the readback signal level from each reader will normally be the same.

One solution to compensate for tape lateral expansion and contraction is to azimuthly rotate the head to a static nominal angle and then make small angular adjustments to keep the project reader span aligned with tracks on the tape. This solution is represented in FIGS. 2A-2C. FIG. 2A shows the head 200 relative to the tape 202, where the tape has a nominal width. As shown, the readers 204 are aligned with the data tracks 206 on the tape 202 and the head is rotated by an angle $\theta_{nom}$. FIG. 2B shows the head 200 rotated by an angle greater than $\theta_{nom}$ to compensate for tape lateral contraction. FIG. 2C shows the head 200 rotated by an angle less than $\theta_{nom}$ to compensate for tape lateral expansion. The problem with this scheme is that the static rotation causes skew-related misregistration and is generally complex and difficult to implement. For example rotating heads must be constructed so as not to steer the tape, etc.

SUMMARY OF THE INVENTION

A tape head according to one embodiment includes an array of readers, each of the readers having a track width, wherein the track width of an inner reader of the array is greater than a track width of an outer reader relative thereto.

A tape head according to another embodiment includes an array of readers, each of the readers having a track width, wherein the track widths of at least some of the readers progressively decrease in a direction along the array from a middle of the array towards an end of the array. For example, the track widths of the readers may progressively decrease from an innermost reader of the array to an outermost reader of the array. The track widths may be scaled linearly from the innermost reader to the outermost reader. The track widths may also be scaled non-linearly from the innermost reader to the outermost reader. In further embodiments, sets of adjacent readers each have about the same track width, at least three sets of readers being present.

The innermost reader may have a track width at least as wide as a written data track on a tape adapted for use with the head, but preferably has a track width that is less than a width of a written data track on such a tape. The outermost reader may have any desired track width, and in one embodiment has a track width that is less than about 0.6 times a track pitch of a tape adapted for use with the head.

One or more servo readers may be positioned outside the array of readers. Writers may also be present on the head.

A tape drive system includes a head as recited above, a drive mechanism for passing a magnetic recording tape over the head, and a controller in communication with the head. The head may further include one or more modules, where the readers are formed on one or more of the modules.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

BEST MODE FOR CARRYING OUT THE INVENTION

Figure 1A:
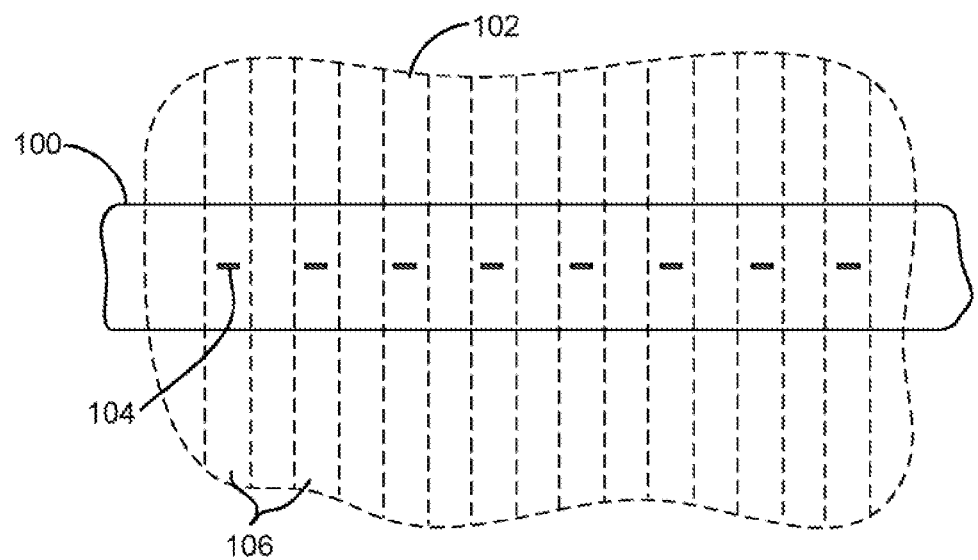
FIGS. 1A-1C illustrate the effect of tape lateral expansion and contraction on a traditional magnetic tape head.
Figure 1B:
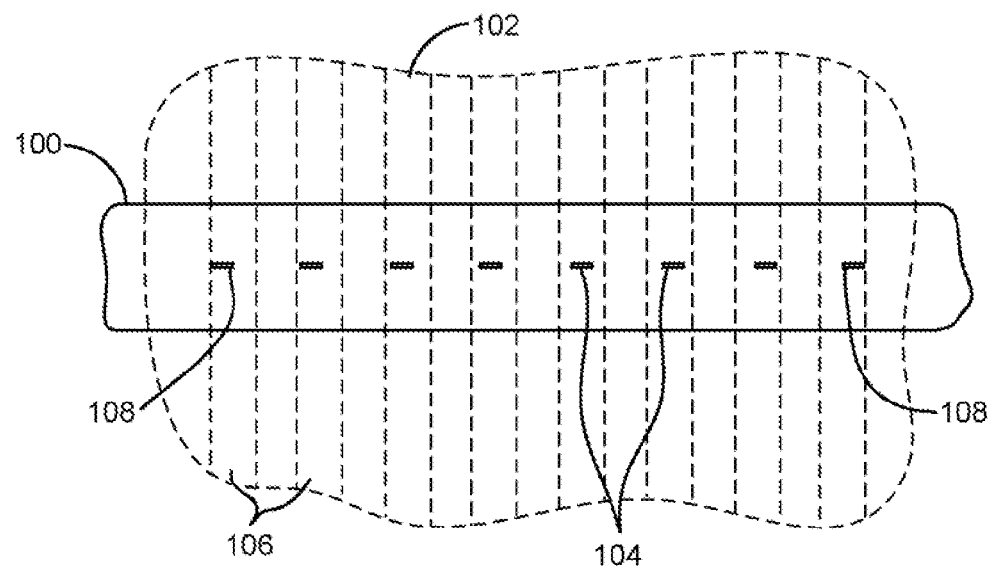
Figure 1C:
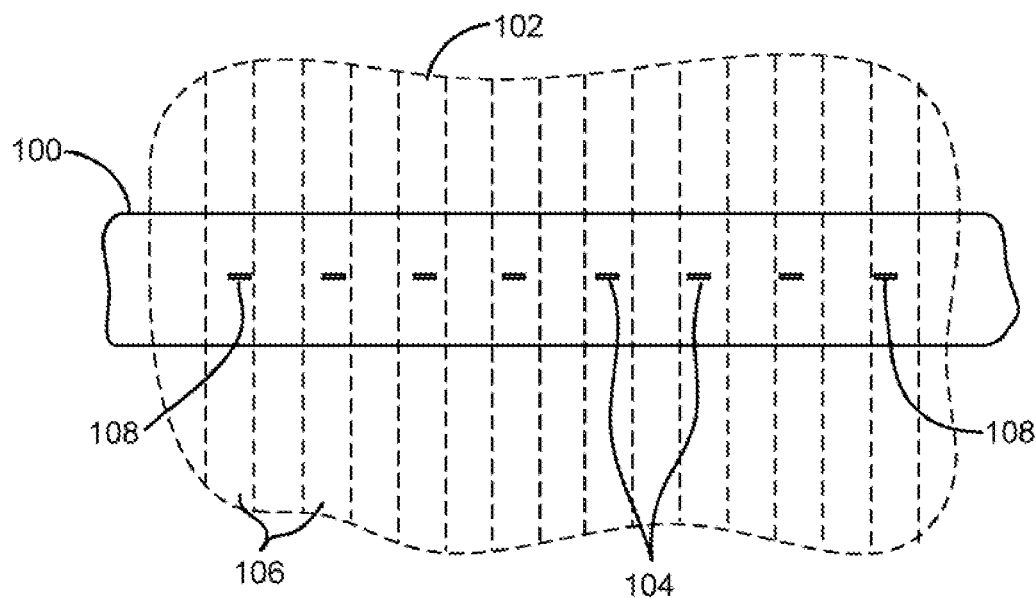
Figure 2A:
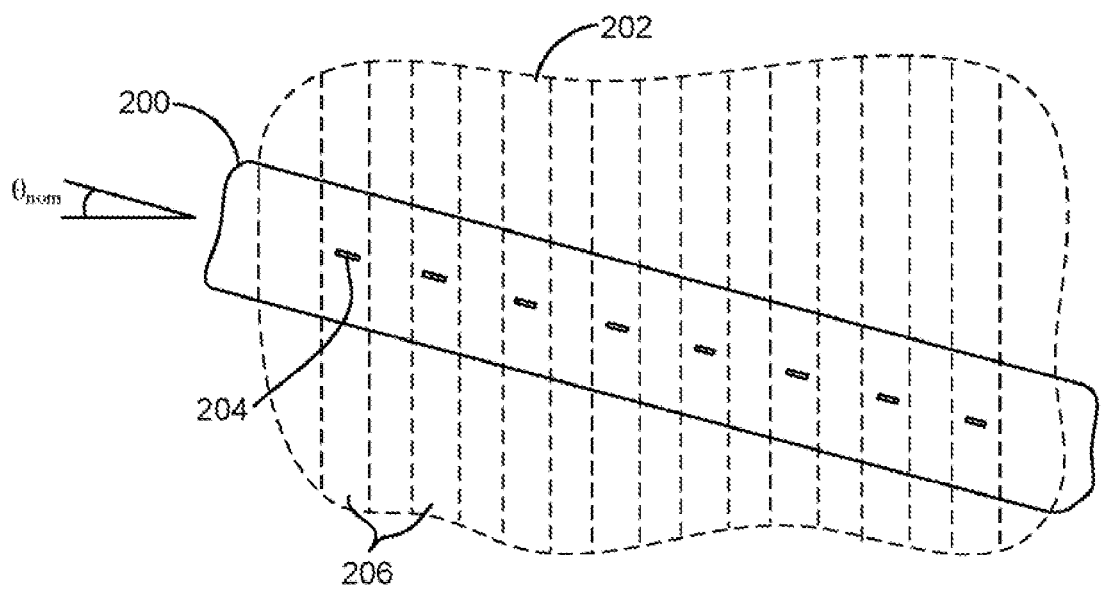
FIGS. 2A-2C illustrate rotation of a traditional magnetic tape head to compensate for the effect of tape lateral expansion and contraction.
Figure 2B:
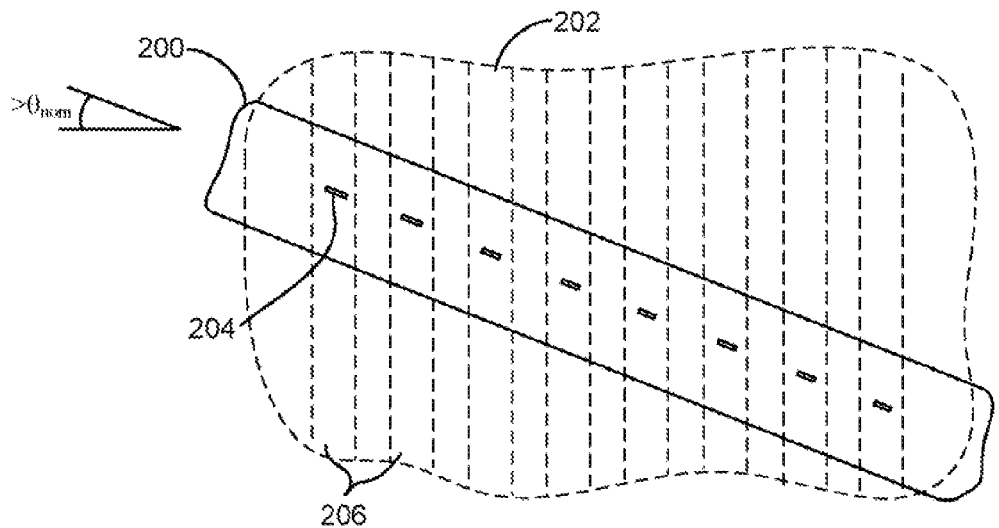
Figure 2C:
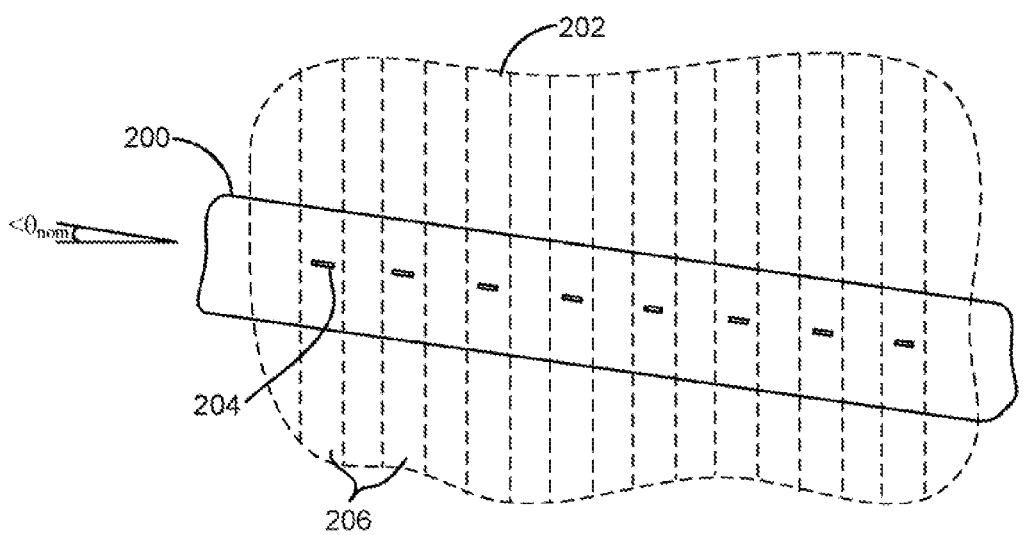

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The present invention includes a multitrack tape head in which the reader track widths are adjusted according to their position in the head so as to maximize track coverage where misregistration is least. This invention may advantageously be implemented using available head and channel technology and does not require complex mechanisms, etc.

Figure 3:
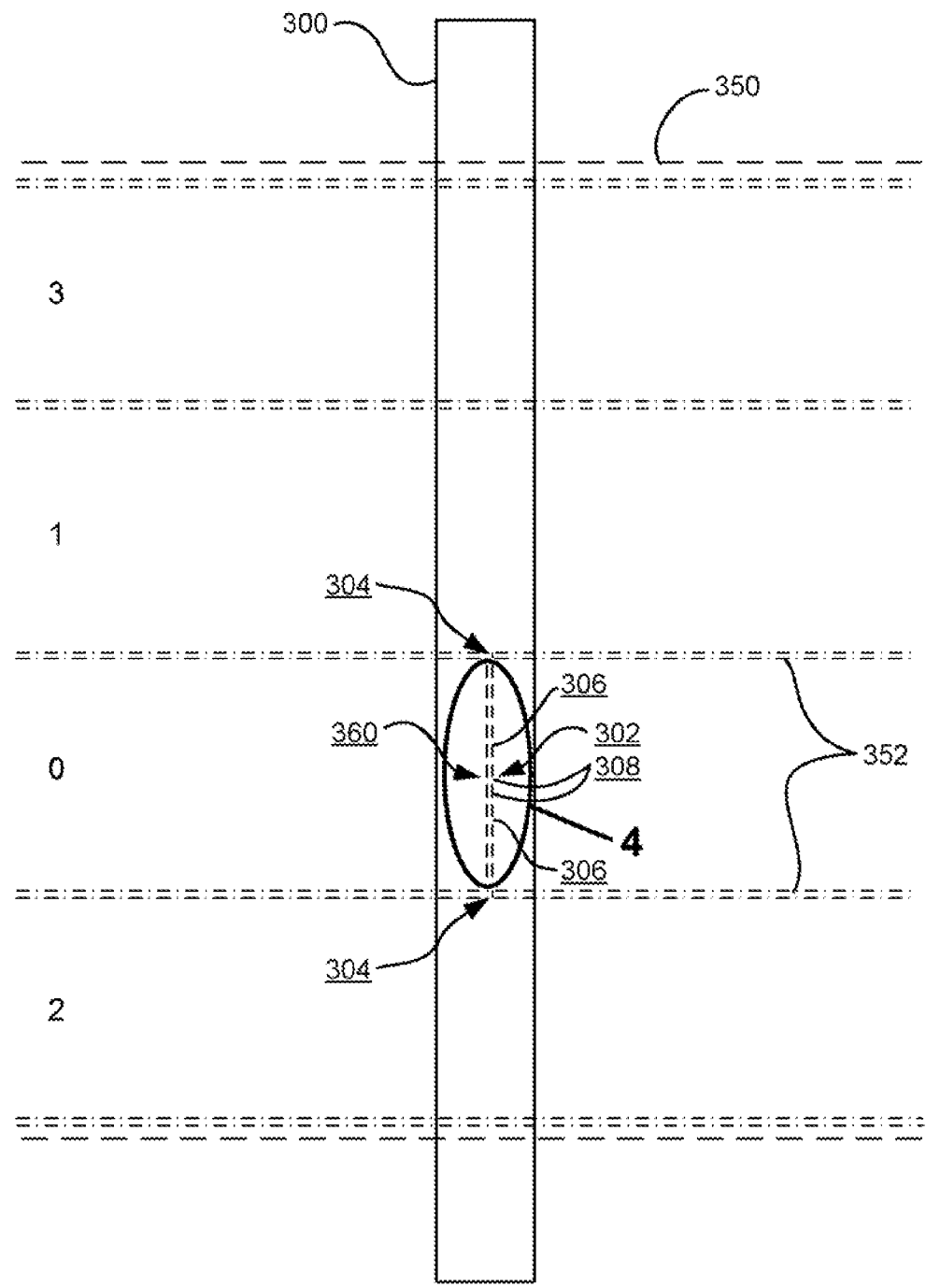
FIG. 3 is a tape bearing surface view of a magnetic tape head according to one embodiment of the present invention.
Figure 4:
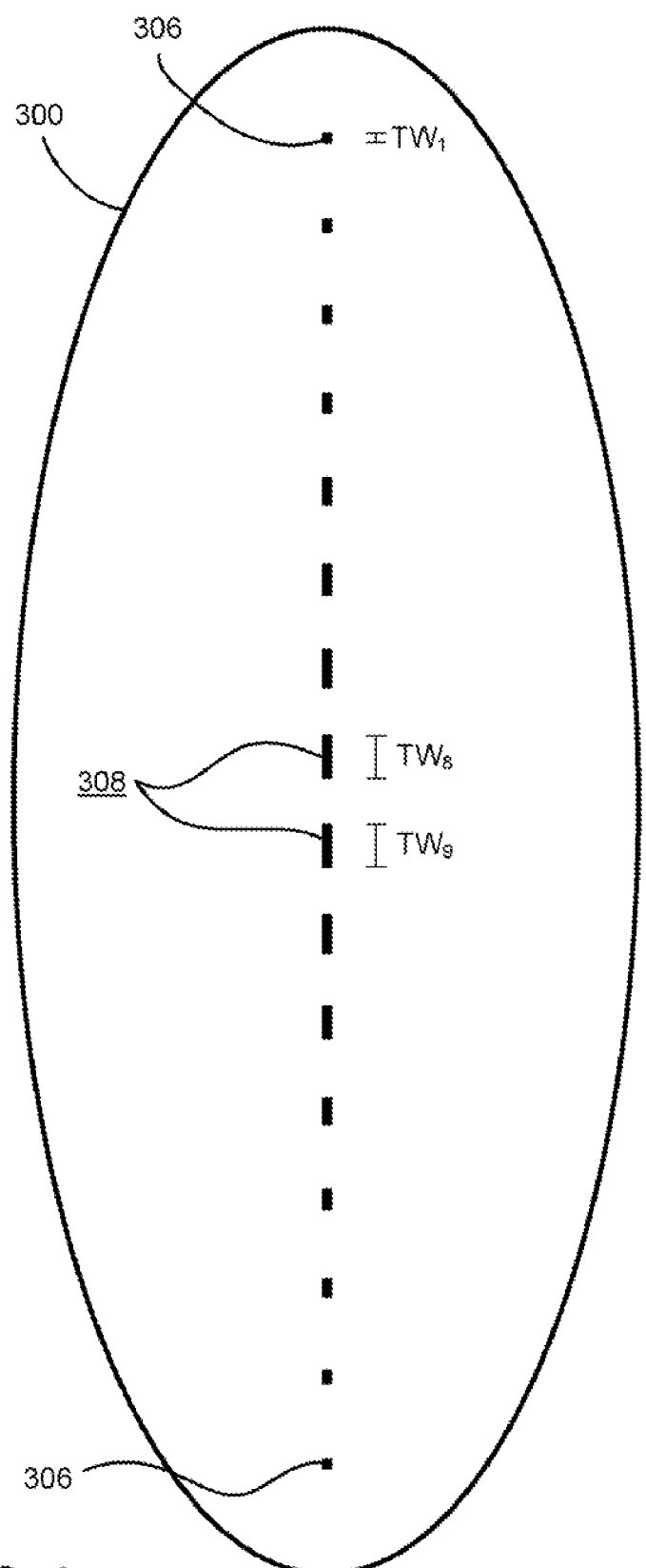
FIG. 4 is a detailed view taken from Circle 4 of FIG. 3 showing the array of readers according to one embodiment of the present invention.

FIGS. 3 and 4 together illustrate a magnetic tape head 300 according to one embodiment of the present invention, where the track widths TW of the readers 302 are scaled according to position in the reader array. For illustration, a tape 350 is shown in dashed lines. The tape has data bands 0, 1, 2, 3. Servo data 352 is factory-written on the tape 350. In Linear Tape Open (LTO), five servo patterns are written, thereby defining the four data bands 0, 1, 2, 3. Each of the data bands has a plurality of data tracks therein, such as 64 tracks, 128 tracks, etc. Each data band is currently 2.9 mm wide in LTO, but may be any width. Similarly, the servo tracks are approximately 0.19 mm wide, but may be larger or smaller. The illustrative head 300 shown has 16 readers 302, but may have more (e.g., 24, 32, 40) or less. Each reader will typically include a sensor and shields that surround the sensor. The sensors may be any type of sensor, including but not limited to Giant Magnetoresistive (GMR) sensors, Anisotropic Magnetoresistive (AMR) sensors, Magnetic Tunnel Junction (MTJ) sensors, etc.

In operation, the servo readers 304 read servo tracks 352 on the tape 350. A controller analyzes the servo readback signal and positions the head 300 at the appropriate position relative to the tape 350 so that the readers 302 or writers 360 are over the appropriate data tracks on the tape 350. If the tape 350 expands, the outermost readers 306 may be adjacent the inside edges of the data tracks, yet the innermost readers 308 are aligned with about the center of the middle data tracks. The servo controller can determine how to center the innermost readers 308 on the middle data tracks. Particularly, servo readers 304 have a very small track width compared to servo tracks, and the controller can determine the lateral position of the head 300 relative to the tape 350 based on the servo readback signal.

The innermost readers 308 may thus be very close to centrally-aligned with the inner data tracks, as tape lateral expansion and contraction will have an increasingly greater effect on the position of the data tracks relative to the outermost readers/writers. Towards the middle of the data band, tape lateral expansion should have very little effect on track/reader misregistration. Accordingly, the readers 302 can be made wider towards the middle of the array, thereby providing an improved signal having greater signal to media noise ratio.

With continued reference to FIGS. 3 and 4, inner readers, preferably including at least the innermost readers 308, have a wider track width than at least some of the outer readers, i.e., those positioned between the inner readers and the ends of the array, and including the outermost readers 306, which neighbor servo readers 304 in this embodiment (see FIG. 3). For example, the track width of the outermost readers 306 may be set at what it would be in a conventionally designed head, e.g., about 0.25 to about 0.6 times the track pitch on the tape. The track widths of the remaining readers 302 progressively decrease from the innermost readers 308 to the outermost readers 306. The pitch (center to center spacing) between the readers 302 is preferably uniform across the reader array.

The progressively narrowing width of the readers reduces misregistration due to mistracking and tape width changes. Tape lateral expansion on some tapes is approximately 1200 ppm. Thus, for present 16-channel LTO heads, in which the outermost tracks are 2.5 mm apart, the tape expansion effect can be as much as 3.0 microns at the outermost readers 306, or 1.5 microns per track. This means that the innermost readers 308 can be wider by approximately this amount, since these readers 308 can be precisely positioned over the central data tracks in a given tape wrap, where all 16 heads simultaneously write tracks down the tape. A wider reader provides a lower noise signal. Particularly, making track widths of the innermost readers 308 wider can boost SMNR (signal-to-media noise ratio) by an amount proportional to the square root of the reader width for the central tracks in future products where the written track pitch will approach 2-3 microns. A preferred embodiment has reader track widths scaled linearly from widest at the innermost readers 308 to narrowest at the outmost reader 306.

Figure 5:
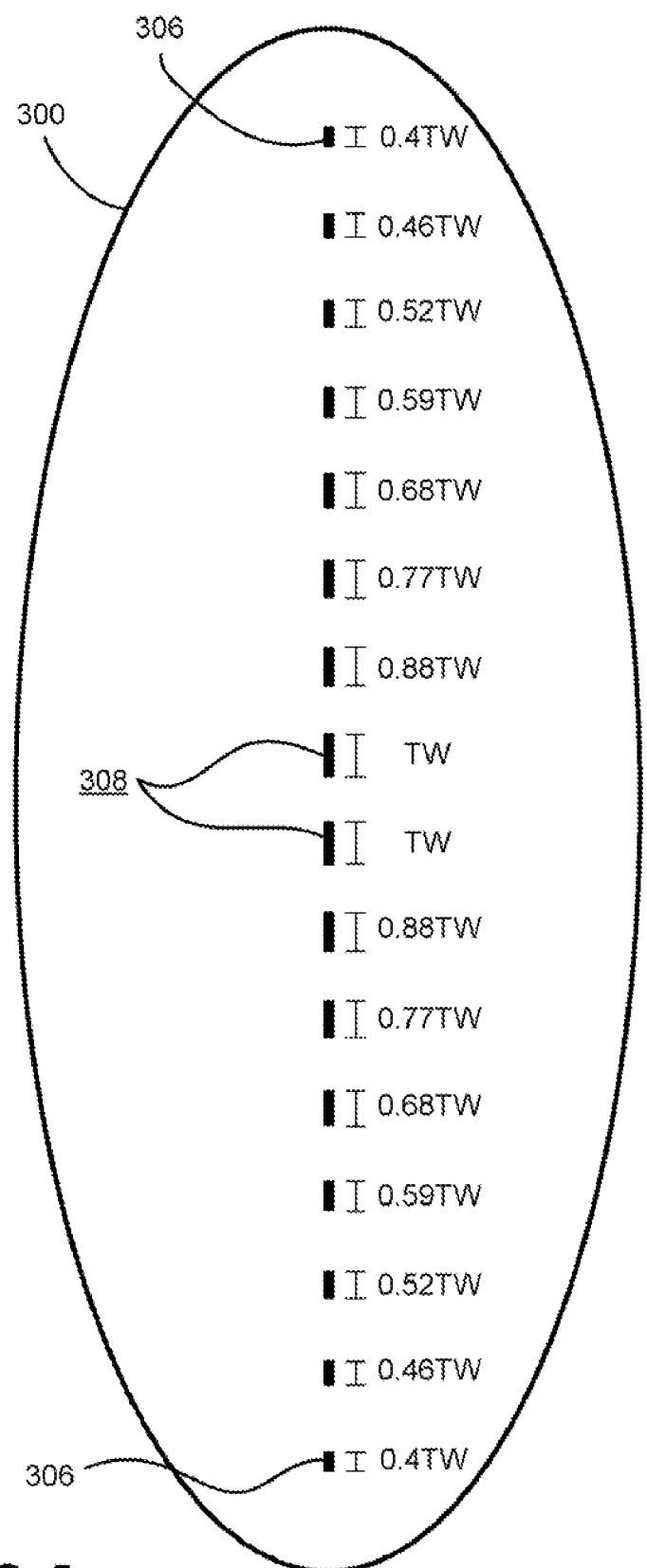
FIG. 5 is a tape bearing surface view of a magnetic tape head having an array of readers according to another embodiment of the present invention.

An alternate embodiment of the present invention has reader track widths scaled non-linearly from widest at the innermost readers 308 to narrowest at the outmost readers 306. FIG. 5 illustrates a head 300 where the reader track widths decrease progressively more pronouncedly from the innermost readers 308 to the outmost readers 306. In the embodiment shown, each reader width is smaller than its inner neighbor by about 14%. In this example, the progression towards narrower readers is more rapid and thus more conservative.

Figure 6:
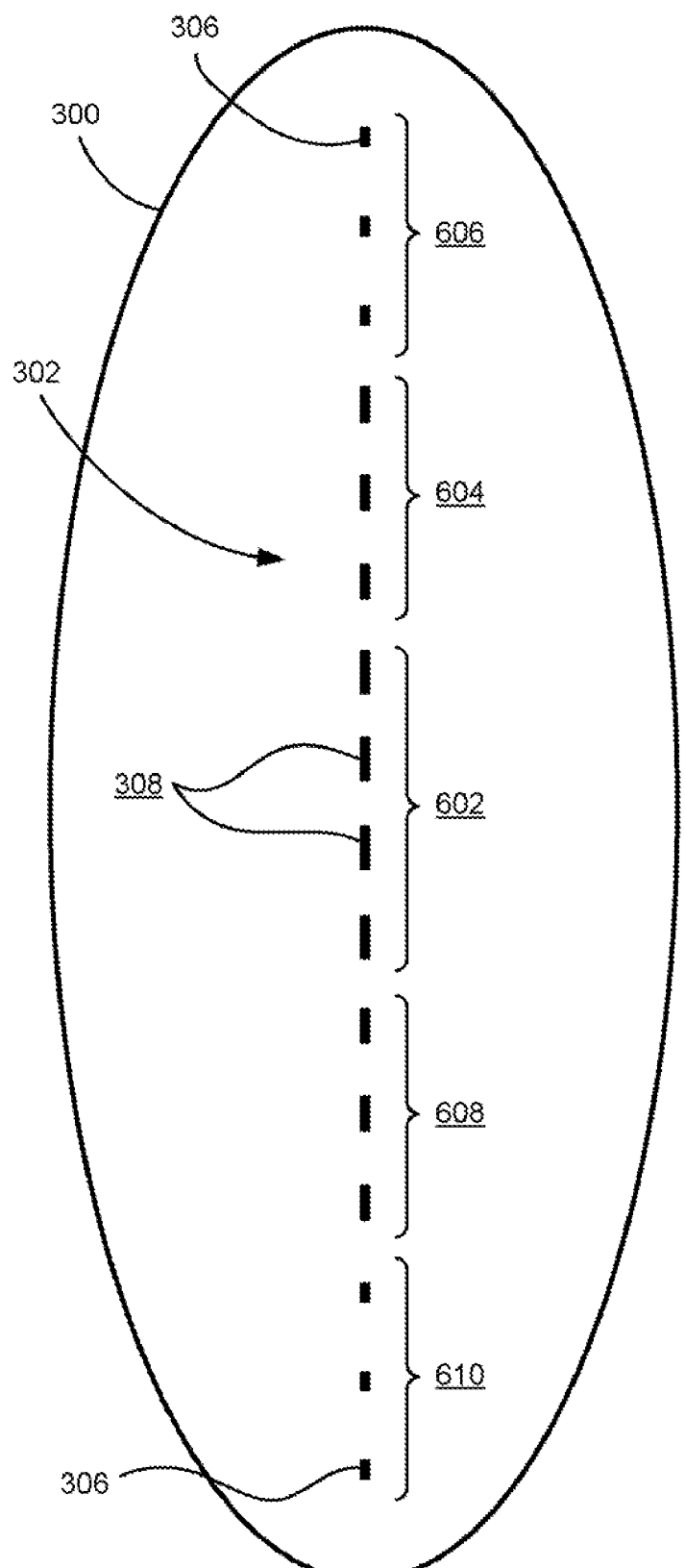
FIG. 6 is a tape bearing surface view of a magnetic tape head having an array of readers according to another embodiment of the present invention.

Yet another embodiment of the present invention, shown in FIG. 6, has adjacent sets 602, 604, 606, 608, 610 of readers 302 with reader track widths being about the same in a given set, where the track widths in a given set decrease from the innermost set 602 to the outermost sets 606, 610. Such an embodiment may be selected for processing considerations.

The track widths of the innermost readers 308 are preferably still smaller than the widths of the written data tracks so that tape lateral transients do not create misregistration. Note that some overlap of the readers 302 onto adjacent data tracks is permissible, as in an embodiment having filtering and/or implementing a deconvolution scheme. Thus, some reader track widths may be as large as, or larger than, the written track widths.

In the heads described above, writers may also be present in a piggyback configuration, an interleaved configuration, etc. Any writers present can be standard writers, and may all have about the same track width.

Figure 7:
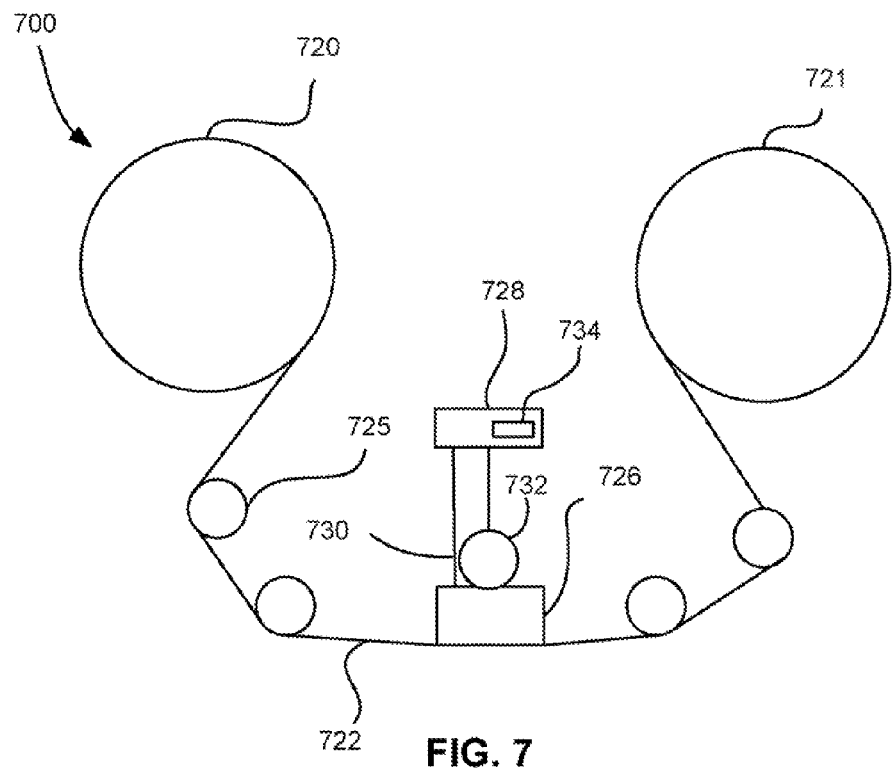
FIG. 7 is a schematic diagram of a tape drive system.

FIG. 7 illustrates a simplified tape drive which may be employed in the context of the present invention. While one specific implementation of a tape drive is shown in FIG. 7, it should be noted that the embodiments of the previous figures may be implemented in the context of any type of tape drive system.

As shown, a tape supply cartridge 720 and a take-up reel 721 are provided to support a tape 722. These may form part of a removable cassette and are not necessarily part of the system. Guides 725 guide the tape 722 across a preferably bidirectional tape head 726, of the type disclosed herein. Such tape head 726 is in turn coupled to a controller 728 via a write-read cable 730. The controller 728, in turn, controls head functions such as servo following, writing, reading, etc. An actuator 732 controls position of the head 726 relative to the tape 722. The controller 728 may include a processor 734 such as an ASIC, microprocessor, CPU, etc. for performing any of the functions described herein.

A tape drive, such as that illustrated in FIG. 7, includes drive motor(s) to drive the tape supply cartridge 720 and the take-up reel 721 to move the tape 722 linearly over the head 726. The tape drive also includes a read/write channel to transmit data to the head 726 to be recorded on the tape 722 and to receive data read by the head 726 from the tape 722. An interface is also provided for communication between the tape drive and a host (integral or external) to send and receive the data and for controlling the operation of the tape drive and communicating the status of the tape drive to the host, all as will be understood by those of skill in the art.

Figure 8:
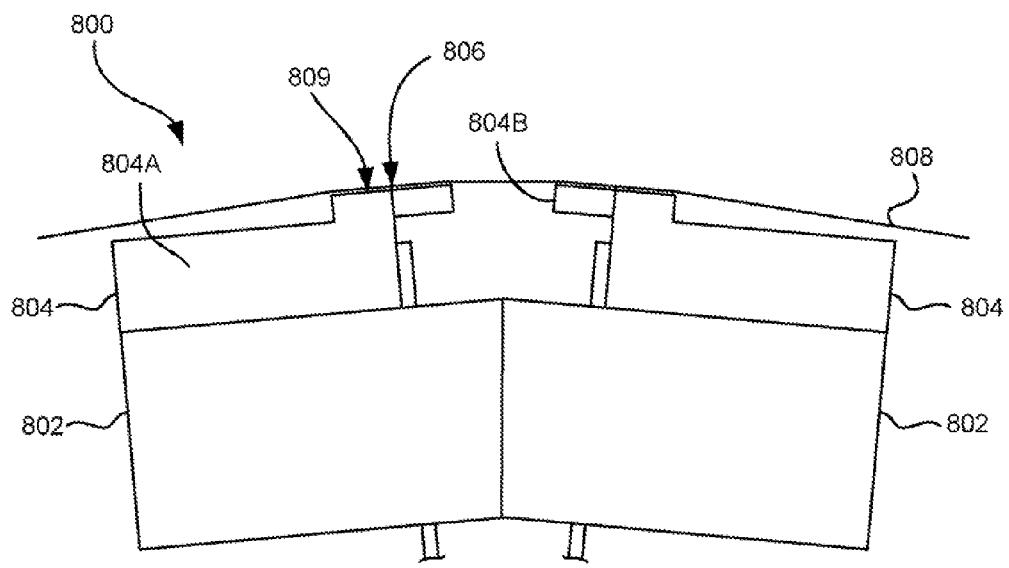
FIG. 8 illustrates a flat-lapped bi-directional, two-module magnetic tape head which may be implemented in the context of the present invention.

FIG. 8 illustrates a flat-lapped bi-directional, two-module magnetic tape head 800 which may be implemented in the context of the present invention. As shown, the head includes a pair of bases 802, each equipped with a module 804. The bases are typically "U-beams" that are adhesively coupled together. Each module 804 includes a substrate 804A and a closure 804B with readers and writers 806 situated therebetween. In use, a tape 808 is moved over the modules 804 along a tape bearing surface 809 in the manner shown for reading and writing data on the tape 808 using the readers and writers 806.

Standard fabrication techniques can be used to create the readers of differing track widths. For example, the physical width of the sensing portion of the sensor itself may define the track width in some embodiments of the present invention. For instance, when defining the active widths of the reader sensors during a photolithography process, mask sizes are adjusted to define the desired reader track widths. In other embodiments of the present invention, the completed or nearly-completed sensor stack can be milled to reduce the physical width of the sensor. In yet other embodiments of the present invention, the ends of the sensor free layers may be pinned via antiparallel coupling with tab overlays, thereby defining the active track width between the pinned portions of the free layer. In further embodiments of the present invention, the ends of the sensor free layers may be pinned via antiferromagnetic coupling with tab overlays, thereby defining the active track width between the pinned portions of the free layer. These embodiments are presented as only a few examples of the many possible ways that the track width can be defined.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape head, comprising:
an array of readers, each of the readers having a track width, wherein the track width of an inner reader of the array is greater than a track width of at least some outer readers positioned on two opposite sides thereof and aligned therewith,
wherein the track widths of the readers progressively decrease from an innermost reader of the array to both outermost readers of the array.

2. The head as recited in claim 1, wherein the track widths are scaled linearly from the innermost reader to the outermost reader.

3. The head as recited in claim 1, wherein the track widths are scaled non-linearly from the innermost reader to the outermost reader.

4. The head as recited in claim 1, wherein the inner reader has a track width at least as wide as a written data track on a tape adapted for use with the head.

5. The head as recited in claim 1, wherein the inner reader has a track width that is less than a width of a written data track on a tape adapted for use with the head.

6. The head as recited in claim 1, wherein an outermost reader has a track width that is less than about 0.6 times a track pitch of a tape adapted for use with the head.

7. The head as recited in claim 1, further comprising an array of writers.

8. A tape drive system, comprising:
a head as recited in claim 1;
a drive mechanism for passing a magnetic recording tape over the head; and
a controller in communication with the head.

9. A tape head, comprising:
an array of readers, each of the readers having a track width, wherein the track width of an inner reader of the array is greater than a track width of at least some outer readers positioned on two opposite sides thereof and aligned therewith,
wherein three sets of multiple adjacent readers are present, the readers in a given set having about the same track width, wherein readers in at least two nonadjacent sets have about the same track width.

10. A tape head, comprising:
an array of readers, each of the readers having a track width, wherein the track width of an inner reader of the array is greater than a track width of at least some outer readers Positioned on two opposite sides thereof and aligned therewith; and
at least one servo reader positioned outside the array of readers.

11. A tape head, comprising:
an array of readers, each of the readers having a track width, wherein the track widths of at least two of the readers progressively decrease in a direction along the array from a middle of the array towards a first end of the array, wherein the track widths of at least two other of the readers progressively decrease in a direction along the array from a middle of the array towards a second end of the array.

12. The head as recited in claim 11, wherein the track widths are scaled linearly from an innermost reader to an outermost reader.

13. The head as recited in claim 11, wherein the track widths are scaled non-linearly from an innermost reader to an outermost reader.

14. The head as recited in claim 11, wherein an innermost reader of the array has a track width at least as wide as a written data track on a tape adapted for use with the head.

15. The head as recited in claim 11, wherein an innermost reader of the array has a track width that is less than a width of a written data track on a tape adapted for use with the head.

16. The head as recited in claim 11, wherein an outermost reader of the array has a track width that is less than about 0.6 times a track pitch of a tape adapted for use with the head.

17. The head as recited in claim 11, further comprising at least one servo reader positioned outside the array of readers.

18. The head as recited in claim 11, further comprising an array of writers.

19. A tape drive system, comprising:
a head as recited in claim 11;
a drive mechanism for passing a magnetic recording tape over the head; and
a controller in communication with the head.

20. A tape head, comprising:
a first module having an array of readers and at least one servo reader positioned outside the array of readers, each of the readers having a track width, wherein the track width of an inner reader of the array is greater than a track width of at least some outer readers positioned on two opposite sides thereof and aligned therewith.

21. The head as recited in claim 20, wherein the track widths of the readers progressively decrease from an innermost reader of the array to an outermost reader of the array.

22. The head as recited in claim 20, wherein sets of adjacent readers each have about the same track width, at least three sets of readers being present, no two sets having a common reader.

23. The head as recited in claim 20, further comprising a second module opposing the first module.

24. The head as recited in claim 23, wherein the second module also has an array of readers, each of the readers of the second module having a track width, wherein the track width of an inner reader of the array of the second module is greater than a track width of an outer reader relative thereto.

25. A tape drive system, comprising:
a head having an array of readers and at least one servo reader, each of the readers having a track width, wherein the track width of an inner reader of the array is greater than a track width of at least some outer readers positioned on two opposite sides thereof and aligned therewith;
a drive mechanism for passing a magnetic recording tape over the head; and
a controller in communication with the head.

26. The head as recited in claim 25, wherein the track widths of the readers progressively decrease from an innermost reader of the array to an outermost reader of the array.

27. The head as recited in claim 26, wherein the track widths are scaled linearly from the innermost reader to the outermost reader.

28. The head as recited in claim 26, wherein the track widths are scaled non-linearly from the innermost reader to the outermost reader.

29. The head as recited in claim 25, wherein sets of adjacent readers each have about the same track width, at least three sets of readers being present.

30. The head as recited in claim 25, wherein the inner reader has a track width at least as wide as a written data track on a tape adapted for use with the head.

31. The head as recited in claim 25, wherein the inner reader has a track width that is less than a width of a written data track on a tape adapted for use with the head.

32. The head as recited in claim 25, wherein an outermost reader has a track width that is less than about 0.6 times a track pitch of a tape adapted for use with the head.

33. The head as recited in claim 25, further comprising at least one servo reader positioned outside the array of readers.

34. The head as recited in claim 25, further comprising an array of writers.

* * * * *